(12) United States Patent
Battat et al.

(10) Patent No.: US 7,693,941 B2
(45) Date of Patent: Apr. 6, 2010

(54) METHOD AND APPARATUS FOR PREDICTIVELY AND GRAPHICALLY ADMINISTERING A NETWORKED SYSTEM IN A TIME DIMENSION

(76) Inventors: Reuven Battat, 11 Mount Grey Rd., Stony Brook, NY (US) 11790; Michael Her, 9 Von Hagen Ave., St. James, NY (US) 11780; Chandrasekhar Sundaresh, 21 Boulevard Dr., Hicksville, NY (US) 11801; Anders Vinberg, 11013 Champagne Point Rd. NE., Kirkland, WA (US) 98034; Sidney Wang, 21 Windwood Dr., Nesconset, NY (US) 11767

( * ) Notice: Subject to any disclaimer, the term of this patent is extended or adjusted under 35 U.S.C. 154(b) by 686 days.

(21) Appl. No.: 11/352,714

(22) Filed: Feb. 10, 2006
(Under 37 CFR 1.47)

(65) Prior Publication Data
US 2007/0075992 A1   Apr. 5, 2007

Related U.S. Application Data

(63) Continuation of application No. 11/155,364, filed on Jun. 17, 2005, now abandoned, which is a continuation of application No. 10/959,342, filed on Oct. 6, 2004, now abandoned, which is a continuation of application No. 10/744,970, filed on Dec. 22, 2003, now abandoned, which is a continuation of application No. 09/558,897, filed on Apr. 26, 2000, now abandoned, application No. 11/352,714, which is a continuation-in-part of application No. 09/408,213, filed on Sep. 27, 1999, now Pat. No. 6,289,380, which is a continuation of application No. 08/892,919, filed on Jul. 15, 1997, now Pat. No. 5,958,012.

(60) Provisional application No. 60/131,018, filed on Apr. 26, 1999, provisional application No. 60/021,980, filed on Jul. 18, 1996.

(51) Int. Cl.
  *G06F 15/16* (2006.01)

(52) U.S. Cl. ............ 709/204; 709/223; 709/224; 709/226; 703/13; 345/418; 345/6; 345/419

(58) Field of Classification Search ............ 709/223, 709/224, 226; 345/418, 376, 419, 6; 706/15, 706/16; 713/706; 715/736; 717/706; 703/13
See application file for complete search history.

(56) References Cited

U.S. PATENT DOCUMENTS 5,437,009 A   7/1995   Lane .................. 345/636

(Continued)

FOREIGN PATENT DOCUMENTS

EP            0 777 357       6/1997

(Continued)

OTHER PUBLICATIONS

Communication Pursuant to Article 94(3) EPC; EPO communication from Stefan Kamps, Primary Examiner for the Examining Division (Germany), regarding EP Application No. 00 928 570.1-2211 (8 pages), Dec. 21, 2007.

*Primary Examiner*—Quang N. Nguyen
*Assistant Examiner*—Hitesh Patel
(74) *Attorney, Agent, or Firm*—Baker Botts L.L.P.

(57) ABSTRACT

A method and apparatus are generally disclosed for presenting predictively and graphically administering a networked system in a time dimension. According to one aspect of the present application, a method is disclosed for presenting a projected status of at least one network system component. The method comprises identifying a present reference time and defining a status time associated with at least one network system component. The status time is future time relative to the reference time. The method also comprises identifying the network system component for presentation. The method further comprises determining a projected status associated with the network system component as of the status time. A representation of the projected status of the network system component is output for presentation. The outputting of the representation includes displaying a three-dimensional depiction of the network system component.

11 Claims, 10 Drawing Sheets

U.S. PATENT DOCUMENTS

| | | | |
|---|---|---|---|
| 5,623,590 A | 4/1997 | Becker et al. | 715/772 |
| 6,125,105 A * | 9/2000 | Edwards et al. | 370/230 |
| 6,320,585 B1 * | 11/2001 | Engel et al. | 345/440 |
| 2001/0042118 A1 * | 11/2001 | Miyake et al. | 709/223 |

FOREIGN PATENT DOCUMENTS

| | | |
|---|---|---|
| EP | 0 883 067 | 12/1998 |
| EP | 0883075 A2 * | 12/1998 |
| WO | WO 98/00954 | 1/1998 |

* cited by examiner

METHOD AND APPARATUS FOR PREDICTIVELY AND GRAPHICALLY ADMINISTERING A NETWORKED SYSTEM IN A TIME DIMENSION

CROSS-REFERENCES TO RELATED APPLICATIONS

This application is a continuation of U.S. application Ser. No. 11/155,364, filed on Jun. 17, 2005 now abandoned and entitled "Method and Apparatus for Predictively and Graphically Administering a Networked System in a Time Dimension," which is a continuation of U.S. application Ser. No. 10/959,342, filed on Oct. 6, 2004 now abandoned and entitled "Method and Apparatus for Predictively and Graphically Administering a Networked System in a Time Dimension," which is a continuation of U.S. application Ser. No. 10/744,970 filed on Dec. 22, 2003 now abandoned and entitled "Method and Apparatus for Predictively and Graphically Administering a Networked System in a Time Dimension," which is a continuation of U.S. application Ser. No. 09/558,897 filed on Apr. 26, 2000 now abandoned and entitled "Method and Apparatus for Predictively and Graphically Administering a Network System in a Time Dimension" and claims priority to U.S. Provisional Application Ser. No. 60/131,018 filed on Apr. 26, 1999. This application is further a Continuation-in-Part of U.S. application Ser. No. 09/408,213 filed on Sep. 27, 1999, which issued on Sep. 11, 2001 as U.S. Pat. No. 6,289,380, which is a continuation of U.S. application Ser. No. 08/892,919 filed Jul. 15, 1997, which issued as U.S. Pat. No. 5,958,012 on Sep. 29, 1999 and which claims priority to U.S. Provisional Application No. 60/021,980 filed Jul. 18, 1996. Each of these related applications is incorporated by reference in its entirety, herein.

BACKGROUND

Applicants' system is in the field of software-implemented methods, systems and articles of manufacture for predictively and graphically administering networks, computers, software systems, logical networks or other components of an information system in a time dimension.

Existing enterprise management application software has very limited ability to index events against time. Using such typical prior art software, a system administrator usually views a system or a malfunctioning component of a system at the present moment, with references to past events being limited to a possible static charting or displaying of historical events. Viewing a past event dynamically at a past point in time cannot be accomplished.

Predicting and viewing future events, and displaying those events by scrolling forward or backward in time, in a way analogous to viewing events as when forwarding or rewinding videotapes while viewing the videotape, has not been possible.

Every organization is subject to chronic conditions comprising combinations of events or particular mixes of workload which tend to lead to problem scenarios occurring. Applicants' system enables users to detect and correct these conditions before they cause serious difficulties.

These different types of chronic conditions have a number of features in common: in order to detect the condition before a failure actually occurs it is useful to retain historical information on the various health factors; the trends in the historical information of the health factors should be continually monitored to predict the onset of a failure; some failures only happen when multiple trigger-factors occur in combination. It is therefore useful to monitor the overall combination of health factors to find usage patterns which typically lead to failures occurring; and the interactions may be so complex that it may not be possible to logically determine which patterns of events can lead to a failure. So a heuristic capability is advisable which can look for similarities in patterns across a period of time and learn through experience to recognize problem situations.

An application program that allows users to navigate among complex data structures often uses the technique of drill-down: at any one level in the view, you can enter some entity visible in the user interface (an icon, an entry in a list, a 3-D object in a scene, or something similar) and see its contents.

Many different variations of this concept exists. The entities may be elements of a program, chapters in a document, items in a catalog, computers and routers managed in a network. The contents may be further objects of the same type, having properties such as price and materials, or statistical measures such as performance and load. To enter the entity, you might double-click, fly into the object in a 3-D scene, or use any other technique.

This drill-down technique is useful, but it has some disadvantages. The operator may have to drill down into several entities, each time going back out to the outer level; the drill-down itself may take more time and more interaction than is convenient; and one cannot readily compare the contents or properties of several items at the same time.

Because existing information management tools have looked at a system being managed from a single point in time, management tools have been reactive rather than predictive. Only when a problem actually arose was there a reactive solution.

SUMMARY

According to one aspect of the present application, a method is disclosed for presenting a projected status of at least one network system component. The method comprises identifying a present reference time and defining a status time associated with at least one network system component. The status time is future time relative to the reference time. The method also comprises identifying the network system component for presentation. The method further comprises determining a projected status associated with the network system component as of the status time. A representation of the projected status of the network system component is output for presentation. The outputting of the representation includes displaying a, three-dimensional depiction of the network system component.

According to another aspect of the present application, a method is disclosed for presenting a status of each of a plurality of network system components. The method comprises identifying a present reference time and identifying a plurality of network system components for presentation. The method also comprises defining a status time associated with at least one of the plurality of network system components. The status time may be in the past, present or future with respect to the reference time. The method further comprises determining a projected status associated with the at least one network system component as of the status time. A representation of the projected status of the network system components is output for the presentation. The outputting of the representation includes displaying a three-dimensional depiction of the at least one network system component.

Applicants' system enables a user to predictively manage information systems in multiple dimensions including a time dimension.

Applicants' system further enables a user to observe the managed enterprise over time, learn its behavior patterns, and predict with quantifiable accuracy the future outcomes of current events and processes. This allows illustratively, redistribution of resources before a managed network slows to a point of ineffectiveness due to overburdened or malfunctioning components. Planning of upgrades and avoiding crippling problems before they occur are made possible by applicants' system.

Applicants' system also provides an administrative system that is self-adapting to system changes and emerging technologies, and through such ability to self-manage to provide cost and time savings to information technology organizations and administrators as the managed system grows.

Applicants' system employs tools familiar to operators, such as tool bars analogous to the common VCR. Illustratively, applicants' system uses VCR buttons to allow information technology managers to view current condition, by "fast-forwarding" through predicted conditions or by "rewinding" to view past conditions. This enables a user of applicants' system to decide when and how to prevent problems.

Applicants' system also provides the capability to detect and resolve these chronic conditions. A number of components contribute to the solution: the means of storing large amounts of historical status information; an analysis engine which can detect patterns and trends; derived formulae that relate patterns and trends to potential problem scenarios; and a means of presenting this complex information to administrators.

Further, applicants' system enables a user to look at system component status data at various points in time, both historical time and future time. For times in the future, the system provides status information based on predicted, planned, budgeted or scheduled information; for times in the past, status information is based on actual information, but may also utilize old predictions, plans, budgets and schedules that have since been overtaken by reality. The information that the system looks at includes configuration data, events, status, numerical quantities and many other kinds of data. The system may contain many user interfaces for reviewing this kind of data.

Applicants' system also provides the "time travel" capability to all these user interfaces. In these cases, the user might like to be able to move to a point in time (in the past or in the future), and review the data using any one of the available user interfaces, make any kind of selection available through these user interfaces, and navigate in the same way that is possible under normal circumstances. In many cases, it is desirable to have a single time selection apply to all the windows that are open in the system's user interface on a single computer.

Applicants' system enables the user to navigate not only spatially, but also through time by use of a virtual device allowing an administrator to scroll forward or backward in time. Such device is analogous to using a VCR, while watching the graphical events unfold in an enhanced, virtual world view. A system administrator using applicants' system may use a three-dimensional interface's ability to logically depict correlations and properties that are not apparent in existing systems.

Applicants' system allows the selection of information to apply to other user interfaces. The user interface of the system contains several other facilities that act to select what information is to be shown in the other user interfaces. There are a number of filtering facilities, based on class membership, parameter values such as status, importance and load, and membership in a business process or other group of objects. There is sometimes a need to have these selections apply across all the windows of the system's user interface at the same time, the same way as the time travel selection does.

Advantageously, applicants' system facilitates "drill-down" functionality by use of an intelligent, virtual magnifying glass which a user can place over a geographic area, subsystem or component, by manipulation of familiar tool bars and other controls, view or magnify additional detail of interest, either at the present time, in the past, or in the future.

The forward-looking capability is provided by applicants' system by use of neural network agents which allows for fast-forward scrolling presented through a world view interface.

Applicants' system combines time dimension functions with the automatic identification of system components and resources.

DETAILED DESCRIPTION

Figure 1:
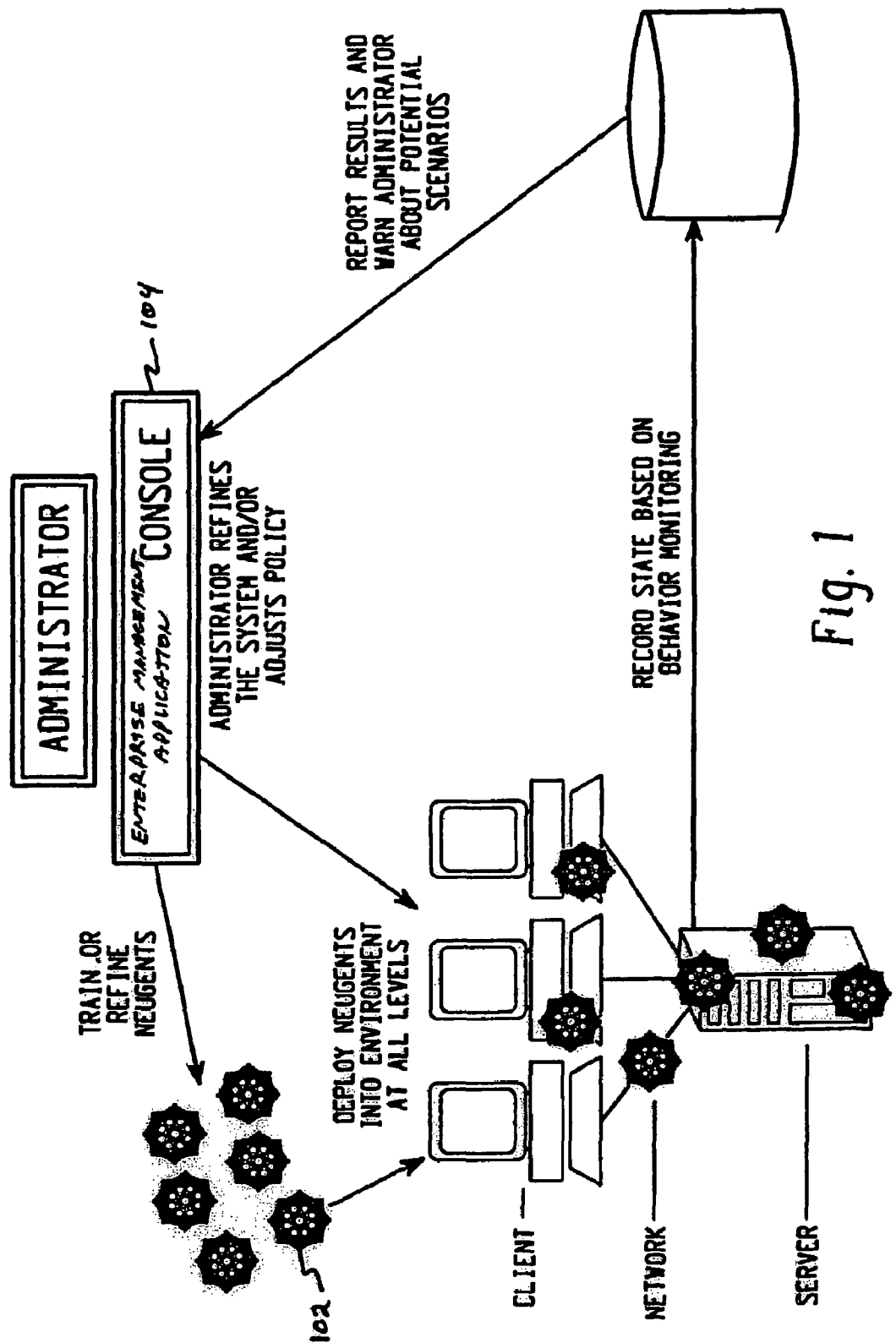
FIG. 1 shows an overall architecture of applicants' system with illustrative deployment of neural network agents throughout the administered system.

Applicants' system comprises an information system management method that uses trained neural network agents, such as agent 102. The neural agents are trained or refined by an enterprise application, such as enterprise management application 104. The neural agents are dispersed throughout the networked enterprise, such as to client 106, network 108 and server 110, to provide information relevant to the administrative and management function in a time dimension. Each neural agent monitors behavior and reports state data to a database 112. The architecture of the method is shown in FIG. 1.

The method is implemented by providing a user interface with controls analogous to those of a VCR for scrolling through time, as illustrated in FIGS. 2-6, or with an intelligent magnifying glass with similar controls, and as illustrated in FIGS. 7-11.

Figure 2:
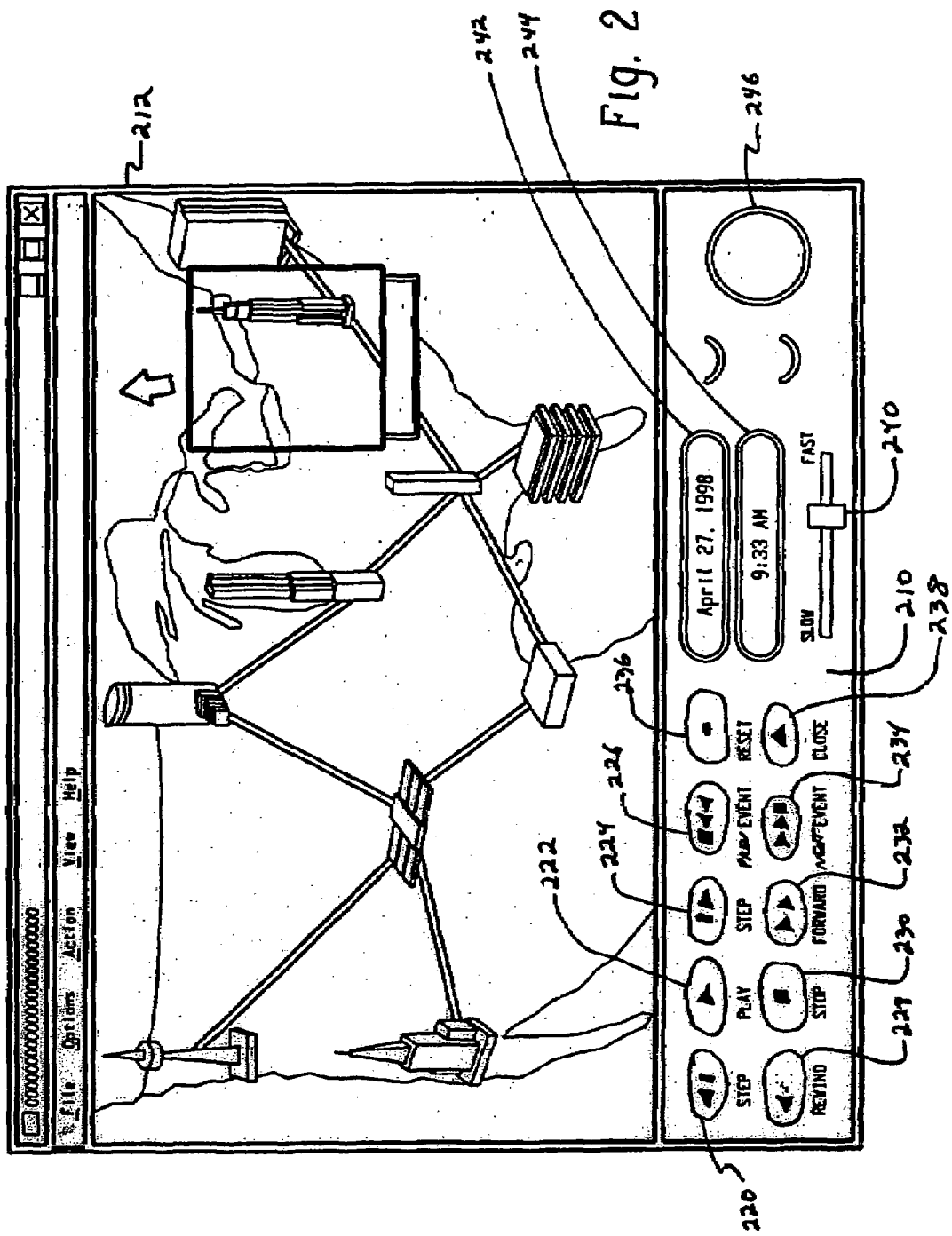
FIG. 2 shows the VCR analogy of applicants' system for controls allowing scrolling backward or forward in time.
Figure 3:
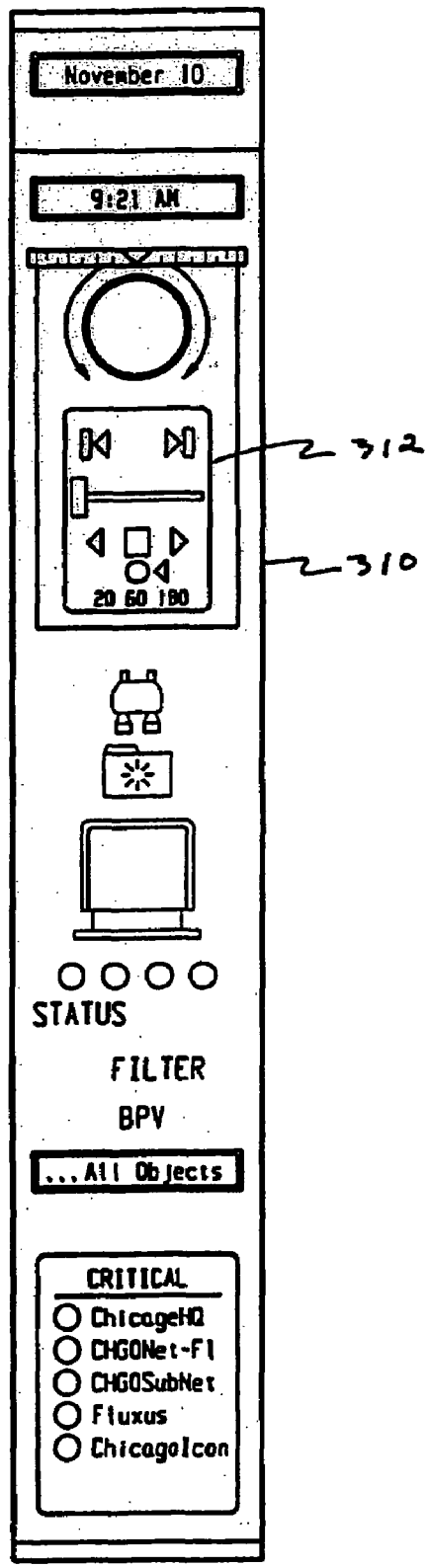
FIG. 3 is an illustration of the control panel with the time navigation area opened, and the time travel buttons visible. Other controls are visible on the control panel.

In one embodiment, time travel is controlled by Tool Bar ("TTB") 210 displayed on the bottom of screen 212 depicted in FIG. 2. TTB 210 includes buttons for controlling the view presented on screen 212. Specifically, TTB 210 includes the following exemplary buttons: step (backward) 220, play 222, step (forward) 224, previous event 226, rewind 228, stop 230, forward 232, next event 234, reset 236 and close 238. TTB 210 further includes date display 242, time display 244, speed control 240 and shuttle control, 246.

The TTB 210 controls the entire screen 212; there is no need for separate TTB's within each window. A user only has to learn one set of controls to review historical or future dates. This architecture avoids the need to redesign the entire architecture of the user interface and the administrative system.

Applicants' system achieves time scrolling without global impact on an existing administrative system by use of time-dimension architecture, e.g., a historian object database is used which stores time series data. This avoids the need to change an existing interface which has the pre-existing capability to receive event notification data. The historian's data is past and future. Future data may be less robust than historical data, but includes (1) schedules, (2) predictions from neural network agents, and (3) manually inputted data.

An object repository feeds information to the historian database (as well as to communications pipelines) without affecting other parts of system; the object repository simply notifies one more resource (the historian, in addition to the communications pipeline). The user interface refers to and presents data based on the VCR controls, and the VCR controls determine the time data used by the historian. This architecture allows time travel which is accompanied (by use of historian as the one more resource to be notified by the repository) with minimum disruption of an existing and extensive administrative system such as that described in application Ser. No. 08/829,919. Minimal impact and disruption on such an existing system is also achieved by using a single set of VCR-style controls.

Other embodiments include a historian (time series data) folded into or merged into a main data base repository, a historian used with each manager or a historian on every agent.

A historian-within-every-agent can keep certain information (e.g., on a specific hard drive) on hand locally to be accessed only on the rare occasions when the historical data on that specific component was requested.

"Historian" data could be kept locally and off-loaded to a central historian at low-use hours (e.g., 3:00 a.m.). A "forgetting" agent could be added to any of the above (central historian, local historian). This would automatically delete information no longer significant, and would achieve the purpose of keeping within available storage (e.g., disc) space, by discarding less important data.

In other embodiments, the historian database can be programmed to filter out data, for example, older than three months or to filter out data on different computers for different times. Alternatively, neural agents could determine what and when to discard data based on patterns of requests.

"Neural network agents" are intelligent agents deployed across the network. These agents provide fuzzy logic and predictive analysis techniques to elevate potential problem scenarios to higher levels in the organizational chain. Fuzzy or lee-way logic is quite different to normal computing algorithms in that there is no single 'correct' answer but instead a range of acceptable conditions. The neural network agents learn by examining historical data to find which patterns and trends lead to unacceptable conditions. This learning process includes the monitoring of collections of components treated as a single entity. It is known as 'unstructured learning' since relationships are not calculated but discovered through experience.

Formulae are established which relate combinations of different events and conditions to end results, and heuristics are applied to refine these formulae. The Neural network agents also detect, from a complex collection of simultaneous factors, which events and conditions have a real impact on problem occurrences and which ones are simply 'noise' that can be ignored in the future. Neural network agents are fully integrated into the administrative system environment and interact with defined rules and policies to determine what performance criteria are acceptable. The neural network agents operate as disclosed in U.S. application Ser. No. 09/084,620 filed on May 26, 1998, the contents of which are herein incorporated by reference. Further, the system may include the automatic identification of all or selected portions of the components comprising the administered network.

According to another embodiment, a movable user interface may be arranged with controls that allow a user to make these operations such as control panel 310 illustrated in FIGS. 3, 4, 5 and 6. Its exterior lay-out and controls are selected to be familiar to users who typically have become familiar with VCR and remote control units. The controls are placed on an area, called here the control panel 310, that is given the appearance of a physical piece of equipment, with a time travel control area 312 having buttons on it for moving backward and forward in time. These buttons could support a number of different ways of traveling, including: manually scrolling back and forth; playing backward and forward; adjusting playback speed; stopping; skipping back or forward to the next significant event; skipping back or forward in specific increments, such as one hour or one day; skipping back a specific increment and start playback for review purposes; jumping to a specific bookmark; and/or returning to normal operation (real-time monitoring).

Figure 4:
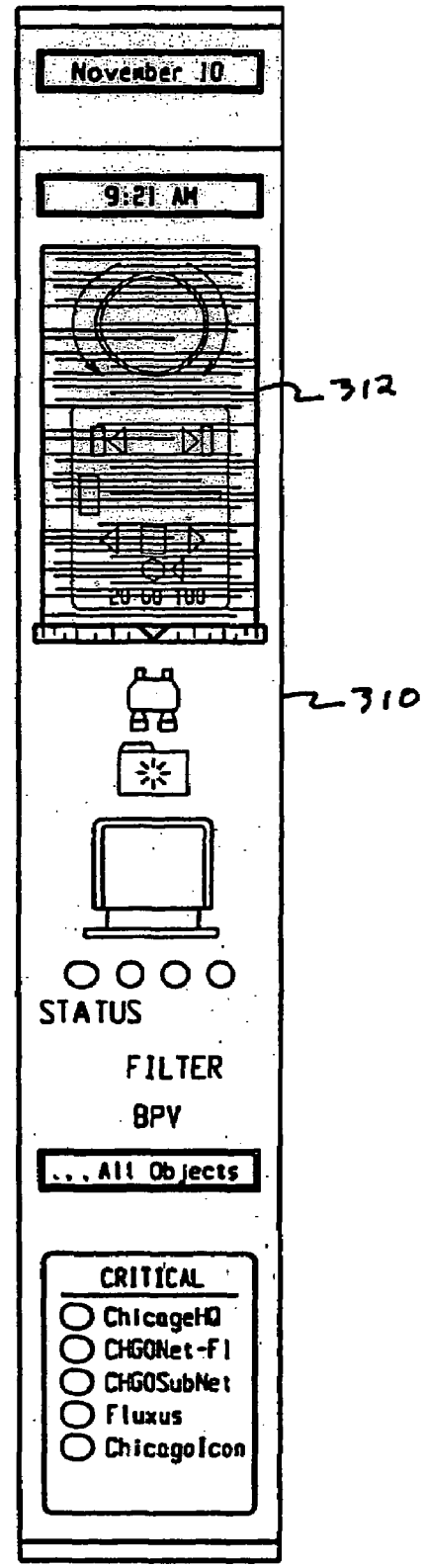
FIG. 4 is an illustration of the control panel with the time navigation area closed, hidden by a translucent piece of glass.
Figure 7:
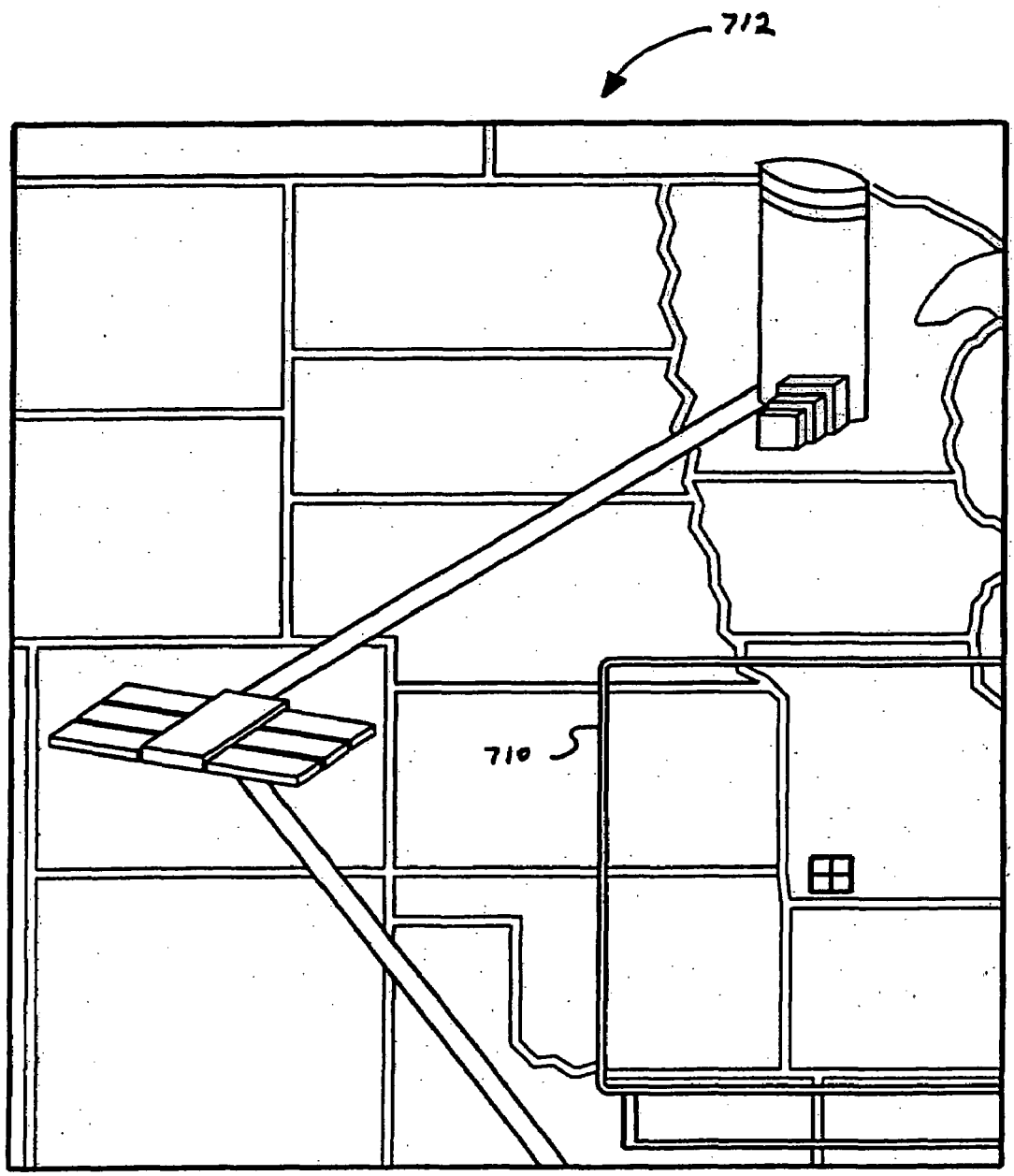
FIG. 7 shows the appearance of the user-friendly Intelligent Magnifying Glass ("IMG") used to "drill down" to additional detail for the subsystem, area, or components "under" such magnifying glass in a time dimension. The Intelligent Magnifying Glass is in the lower right of FIG. 7, over an application that shows 3-dimensional objects over a map. The magnifying glass is not over any object, so it is essentially clear, showing only clear glass and metal, with some reflections and shadows.

In addition, the control panel 310 contains other controls for activating filters of different types. These controls can take different forms, depending on what type of filtering is provided. The control panel is made to resemble a physical piece of equipment, made out of metal, plastic and glass, through the use of textures, lighting effects and shadows. For example, as best illustrated in FIG. 4, when it is not used, the time travel control area on the control panel 310 takes the appearance of being hidden by a pane of translucent, black glass. As illustrated in FIG. 7, when it is used, the pane of glass slides up, revealing the time travel buttons. To disable time travel, the user slides the pane of glass down again. The entire control, with its appearance of a physical device, can be docked along the left or right edge of the monitor. It can also be disconnected from the edge and used like a remote control for a video tape recorder.

Figure 5:
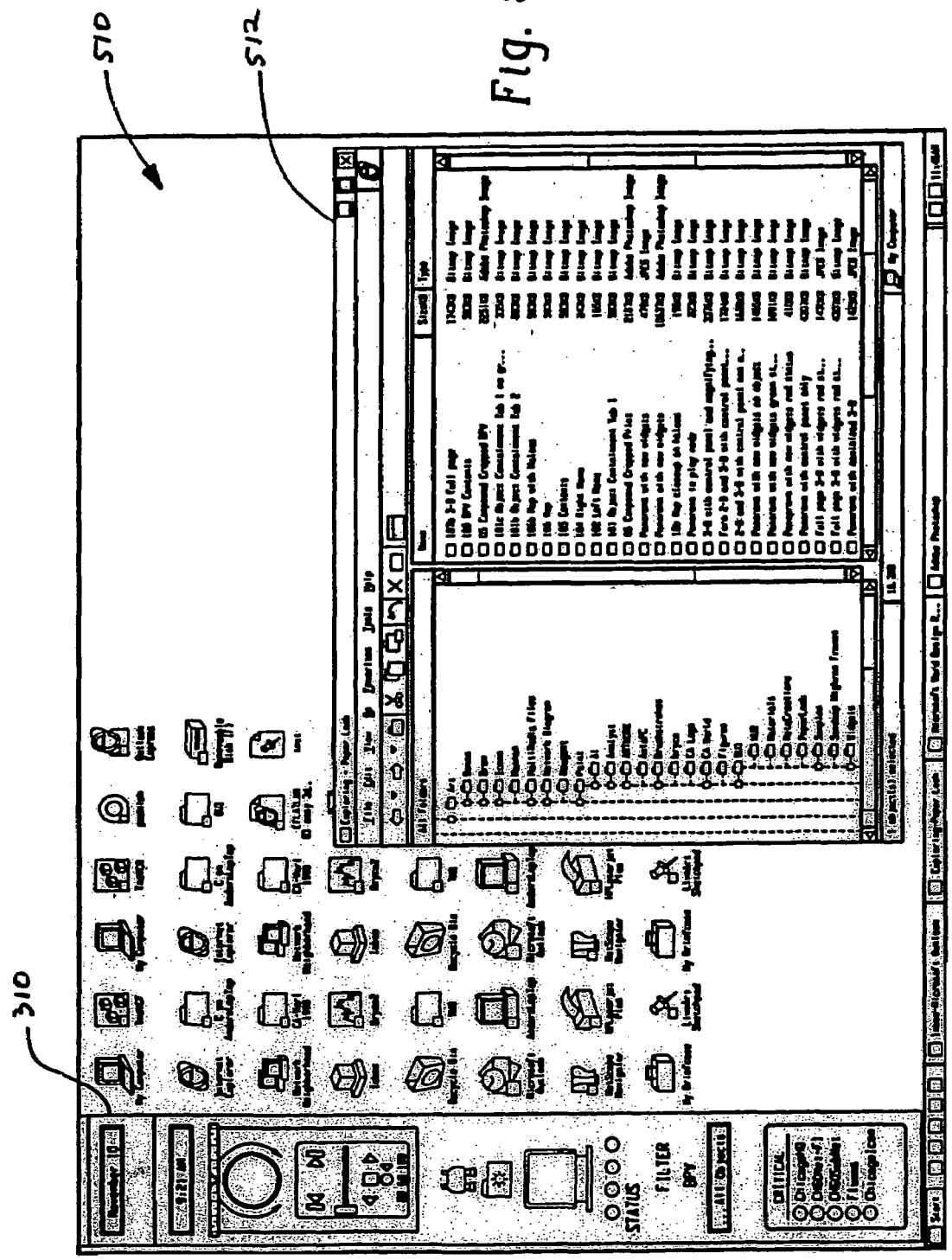
FIG. 5 is a Windows desktop with various icons and windows, showing the control panel docked along the left edge.
Figure 6:
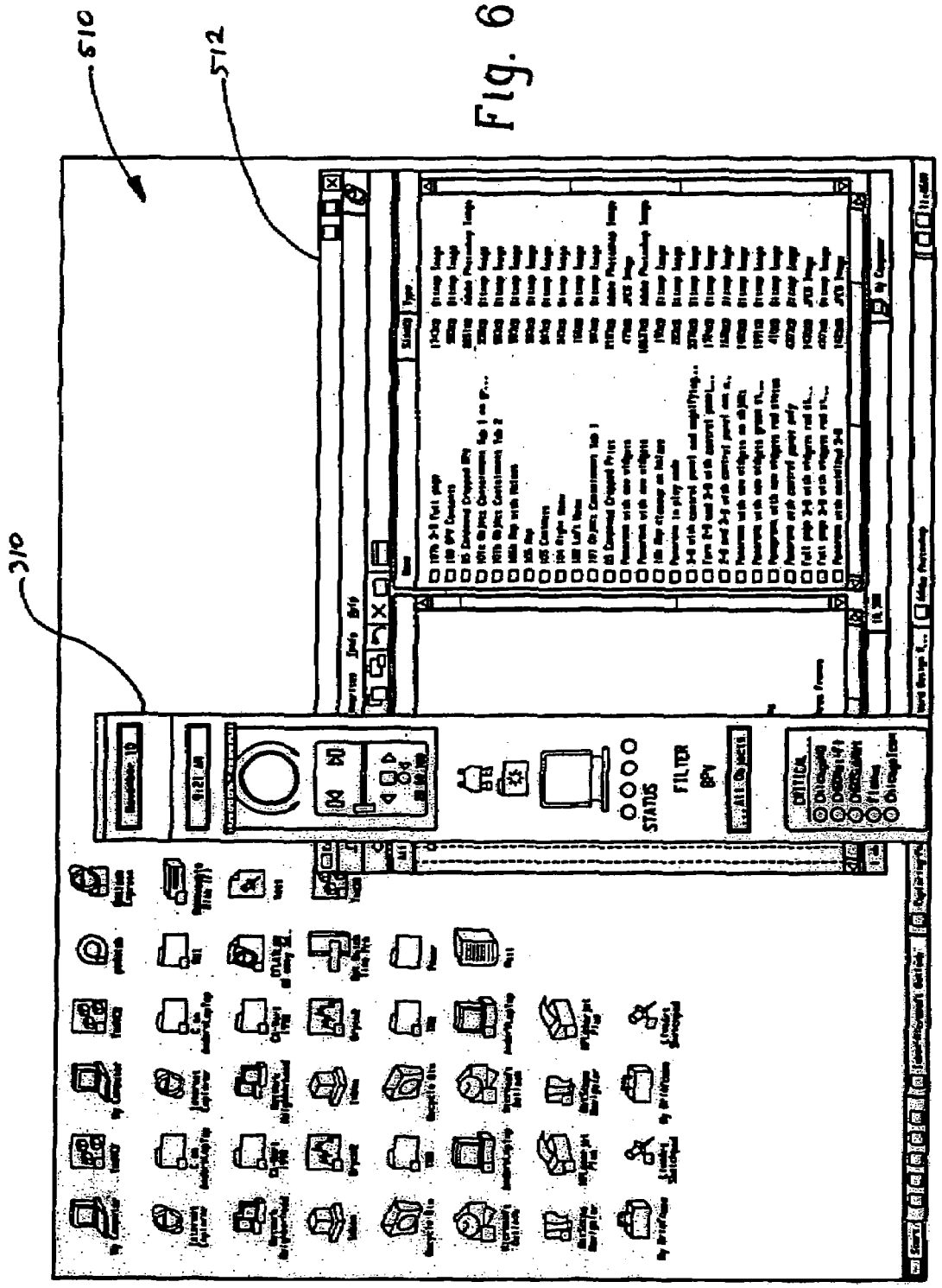
FIG. 6 is the same window shown in FIG. 5, but with the same window with the control panel floating.

The application that might make use of the facility shown in FIG. 5 is not shown, since its specific appearance is not relevant: in principle, applicants' system could apply to any application, including the standard Windows Explorer 512 shown here. Note that the control panel 310 registers itself with Windows as a standard toolbar, thus ensuring that icons and windows are moved over so they are not obscured. This leaves the Windows desktop 510 unaffected, and the icons on the desktop take their ordinary position, in the upper left corner. FIG. 6 illustrates that the control panel 310 may be repositioned over the desktop 510 and specific applications such as Windows Explorer 512.

According to another aspect of Applicant's system, an Intelligent Magnifying Glass ("IMG") facilitates "drilling-down" to more detailed information. The IMG is illustrated in FIGS. 7 through 11 and provides a quick and convenient tool for reaching down and bringing up information for display. FIG. 7 illustrates the IMG 710 may be moved over the display, and when placed over an object, information about the object is generated and displayed. This display may take many forms. When the main display 712 shows 3-dimensional representations of the objects, the magnifying glass 710 may bring up a 3-D view of an internal object that has the key problem. Once an interesting object has been located, the magnifying glass 710 can display specialized information about the object on fly-out panels. This information display may take [many] other forms, depending on the type of object and on the user's request.

Figure 8:
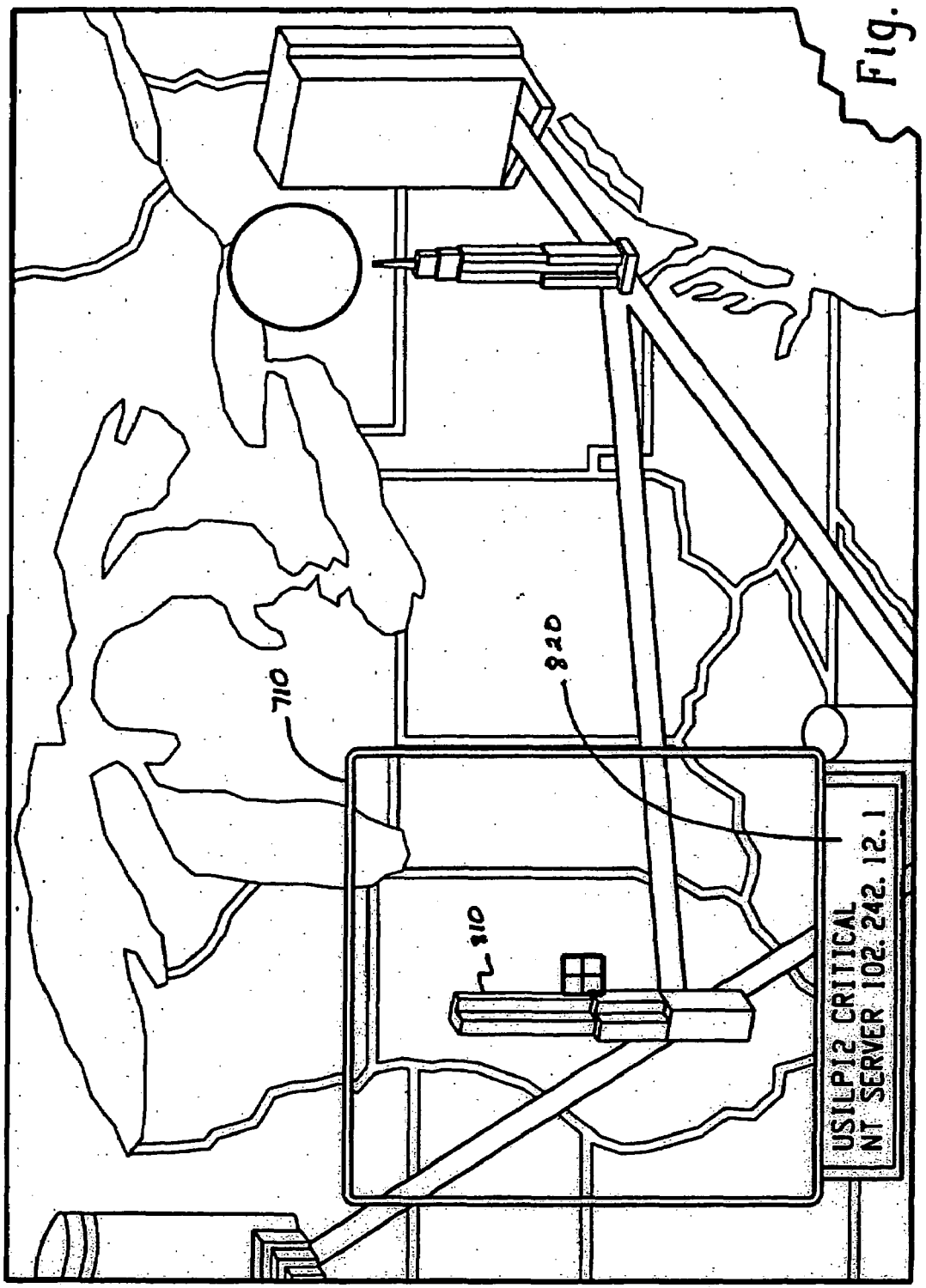
FIG. 8 shows the Intelligent Magnifying Glass when placed over an object. The magnifying glass identifies the object by turning the lower area into nearly opaque frosted glass, with identifying text and other useful parameters display on top of it. The magnifying glass itself remains clear until some further action is taken.

FIG. 8 shows the Intelligent Magnifying Glass 710 when placed over an object 810. The magnifying glass 710 identifies the object 810 by turning the lower area 820 into nearly opaque frosted glass, with identifying text and other useful parameters display on top of it. The viewing area of magnifying glass 710 remains clear until some further action is taken.

Figure 9:
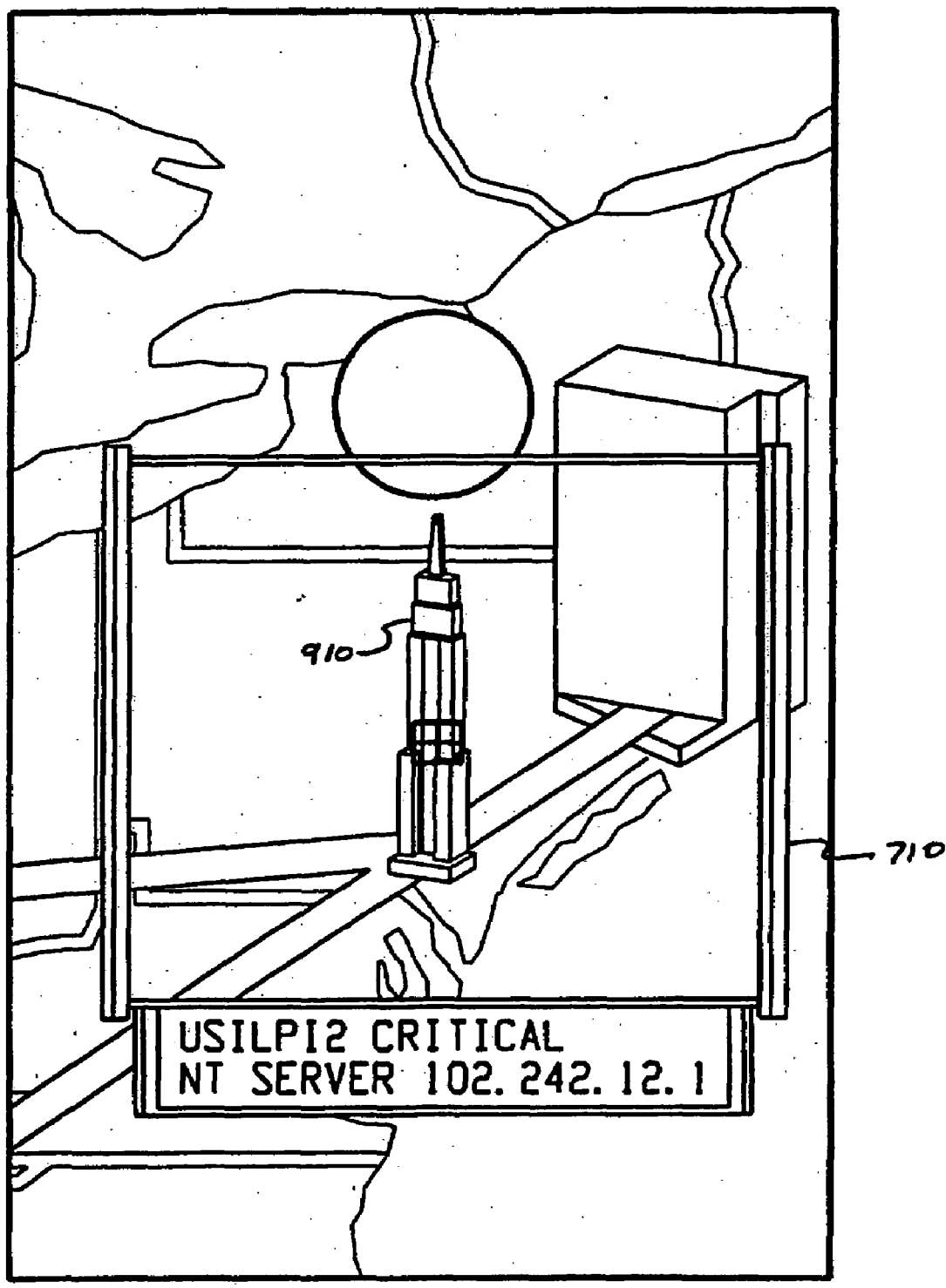
FIG. 9 shows the Intelligent Magnifying Glass when placed over an object with some sort of problem status. The magnifying glass indicates the problem status by turning the metal red, and shining a red light on the lower glass pane.

FIG. 9 shows the Intelligent Magnifying Glass 710 when placed over an object 910 with some sort of problem status. The magnifying glass 710 indicates the problem status by turning the metal red, and shining a red light on the lower glass pane.

Figure 10:
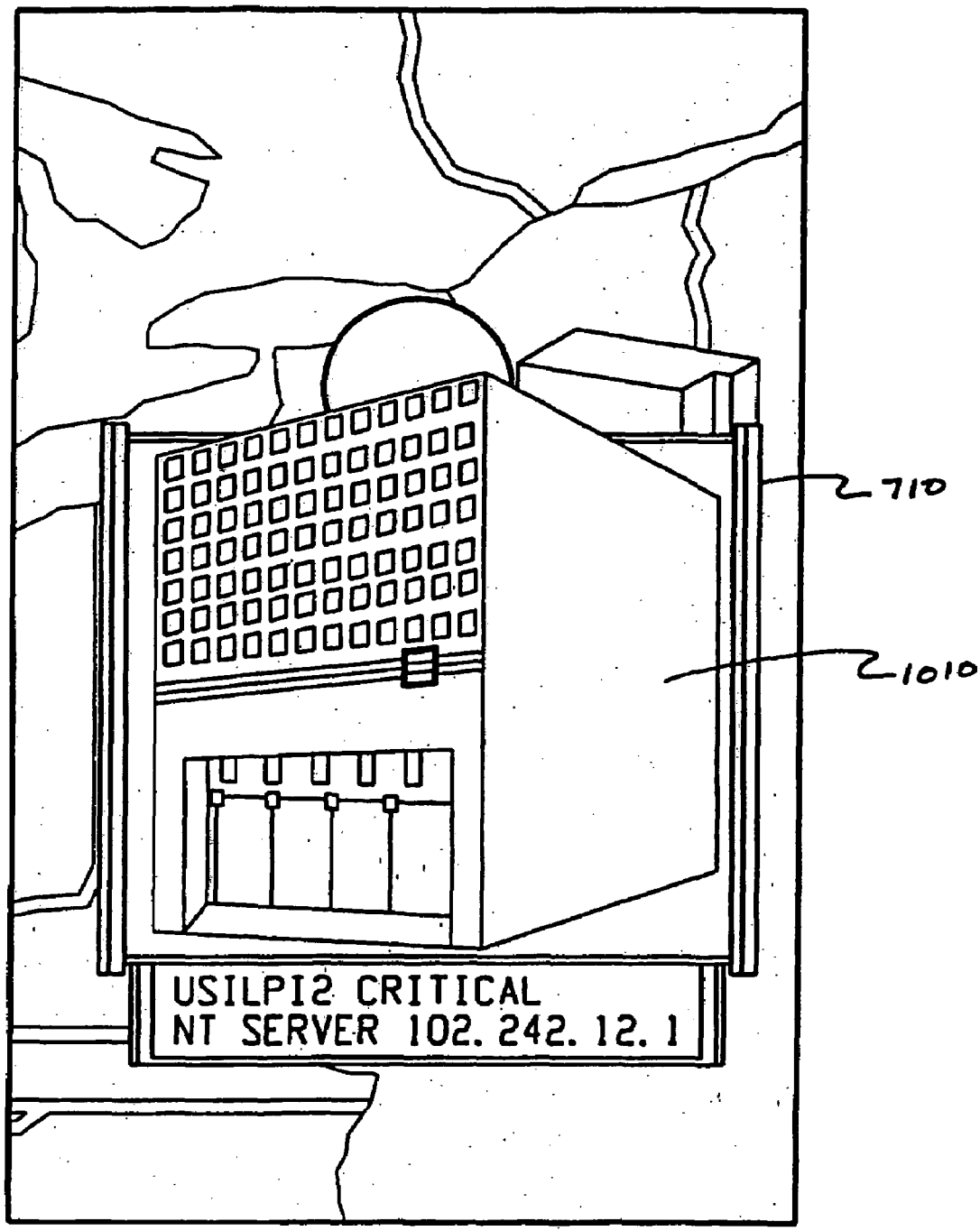
FIG. 10 shows the Intelligent Magnifying Glass after being placed over an object experiencing a problem: the magnifying glass then reaches down into the critical object, identifies the source of the problem (or some other interesting object) and displays it, in this case in the form of a 3-D object.

FIG. 10 shows the Intelligent Magnifying Glass 710 after being placed over an object experiencing a problem: the magnifying glass 710 then reaches down into the critical object, identifies the source of the problem (or some other interesting object) and displays it, in this case in the form of a 3-D object 1010.

Figure 11:
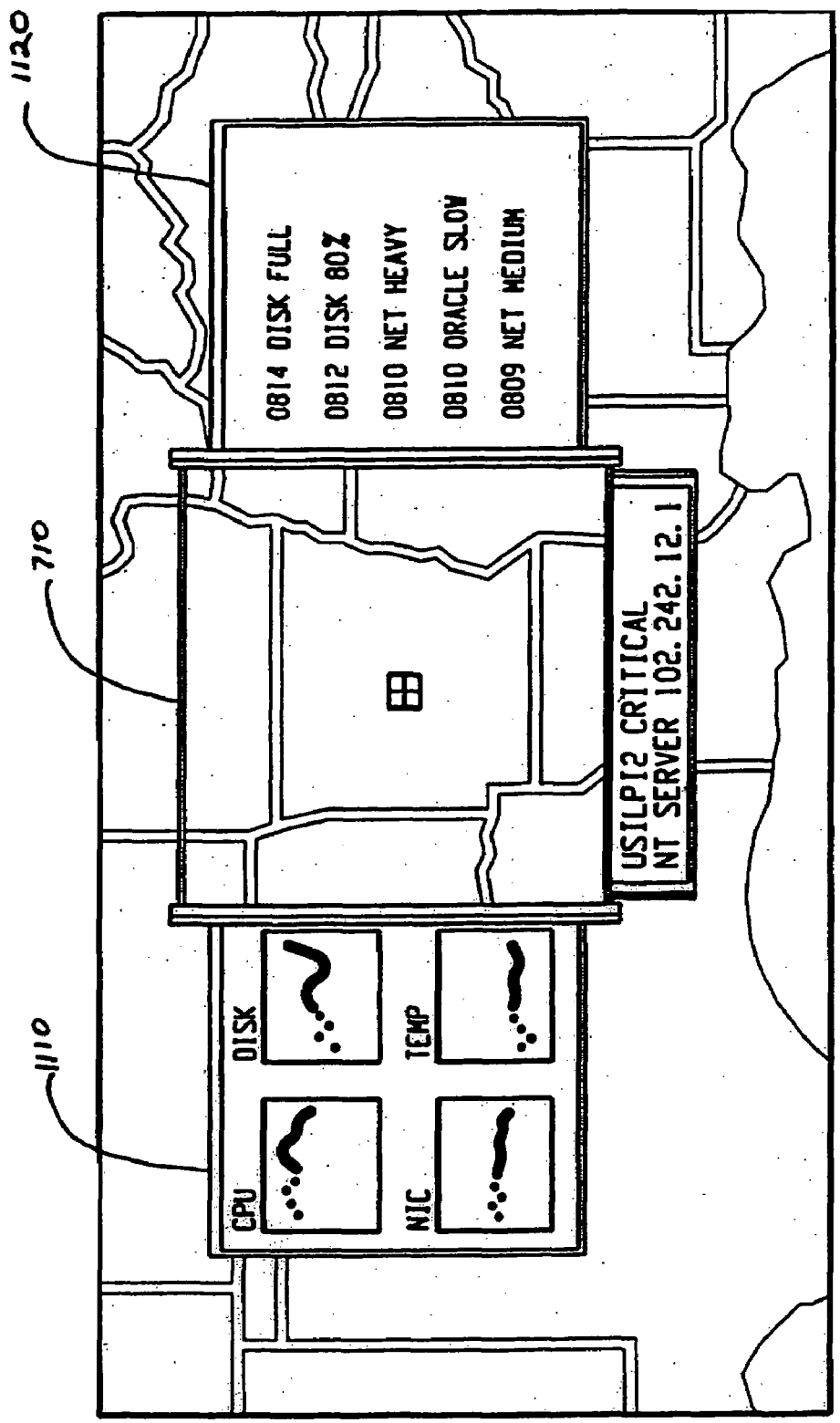
FIG. 11 shows the Intelligent Magnifying Glass, having received a request, displaying fly-out panels that display further information about the object, using various visual representations—charts, tables, text, whatever is chosen by the application. In this illustration, the magnifying glass is shown correctly, but in operation it would be sitting over an object.

FIG. 11 shows the Intelligent Magnifying Glass 710, having received a request, displaying fly-out panels 1010 and 1020 that display further information about the object, using various visual representations—charts, tables, text, whatever is chosen by the application. In this illustration, the magnifying glass is shown correctly, but in operation it would be sitting over an object.

All the specific choices of visual representation used within the magnifying glass 710 and its associated surfaces are under the control of the underlying application program and its database. Some examples of the specific unique features of this aspect of applicants' system include: the visual appearance, with the glass-and-metal magnifying glass, devoid of all information when it is empty; the way an object is identified when the magnifying glass appears over an object, in the text area underneath; the way the status of the object is reflected in the red coloration of the metal edges and the red light shining on the text area; the ability of the magnifying glass to drill down into the contents of the selected item, choose an interesting item based on some decision-making rule defined by the application, and visualize the selected object, using a visualization determined by the application, the fly-out panels that display relevant information, with content and visualization determined by the application; the translucent (not completely opaque) appearance of the text area, to simulate the appearance of a frosted glass pane; and the translucent (not completely transparent) appearance of the magnifying glass, to simulate a glass pane.

Applicants' system also addresses the task of inputting the huge amount of meta-data which defines the components of the environment and the network connections between them. The management tools have to be aware of components before they can be monitored or managed. The automatic discovery function of applicants' system allows it to investigate the network to find all networked objects and resources including: system model, CPU type, network cards, routers, hubs, gateways, management applications, databases and applications for which agents exist. Secondary level discovery uses rules to discover other software for which no agent has been implemented. It documents the discovered components in the object repository.

The automatic discovery process also seeks out any intelligent agents which have been installed and documents these along with the physical components. Applicants' system also utilizes logical groupings of software and processes managed by agents which would otherwise escape categorization. This enables the capability of extending the system to include the management of new types of components. Business process views can be defined against objects representing physical or logical components in any combination to provide great flexibility in assigning responsibilities.

Implementation of applicants' system is facilitated through use of the methods and apparatus set forth in U.S. Provisional Application Ser. No. 60/131,019 entitled "Method and Apparatus for Maintaining Data Integrity Across Distributed Computer Systems" which is hereby incorporated by reference in its entirety.

Persons of ordinary skill in the art possess the skill to implement the above disclosures and to recognize that other implementations of the preferred embodiment may be made. Such other implementations are within the spirit and scope of the present disclosure.

What is claimed is:

1. A method for presenting a projected status on a display device of at least one network system component, the method comprising:

identifying a present reference time;

defining a status time associated with at least one network system component, the status time being a future time relative to the reference time;

identifying the at least one network system component for presentation;

determining a projected status associated with the at least one network system component as of the status time; and outputting an indication of a problem with the at least one network system component in response to determining the projected status of the at least one network system component, and displaying a three-dimensional depiction of the at least one network system component on said display device.

2. The method of claim 1, wherein determining the projected status includes accessing and processing schedule data associated with the at least one of network system component.

3. The method of claim 1, wherein determining the projected status includes accessing and processing historical data associated with the at least one network system component.

4. The method of claim 1, wherein determining the projected status is performed by a neural network.

5. The method of claim 4, wherein the neural network is a feed forward neural network.

6. The method of claim 4, wherein determining the projected status includes pattern matching performed by the neural network in a manner that examines historical data comprising problematic conditions.

7. The method of claim 1, wherein determining the projected status is performed by an expert system.

8. The method of claim 7, wherein the expert system is generated by a neural network.

9. The method of claim 1, wherein the step of automatically identifying includes filtering the at least one network system components to provide a business process view.

10. The method of claim 1 wherein defining the reference time includes receiving the reference time from an application.

11. A method for presenting a status of each of a plurality of network system components on a display device, the method comprising:

identifying a present reference time;

identifying a plurality of network system components for presentation;

defining a status time associated with at least one of the plurality of network system components, the status time being in the past, present or future with respect to the reference time;

determining a projected status associated with the at least one of the plurality of network system components as of the status time; and outputting an indication of a problem with the at least one network system component in response to determining the projected status of the at least one of the plurality of network system components, and displaying a three-dimensional depiction of the at least one network system component on said display device.

* * * * *